F. C. REINECKE.
JOINT FOR CRATES.
APPLICATION FILED JULY 25, 1912.
1,098,405.
Patented June 2, 1914.
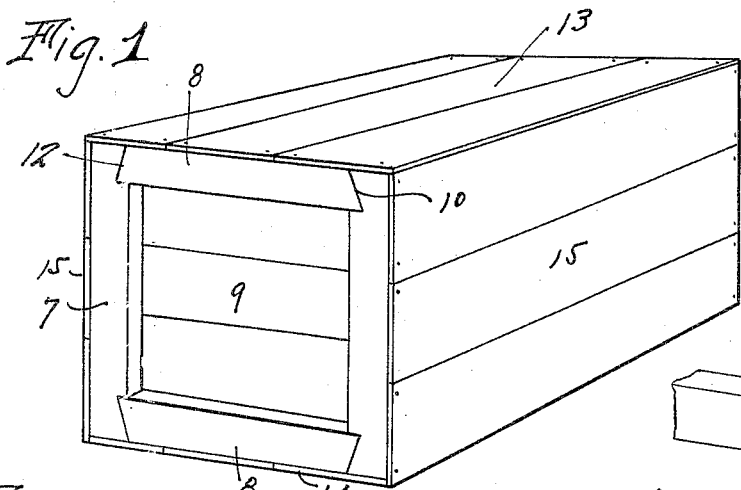
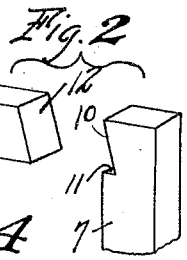
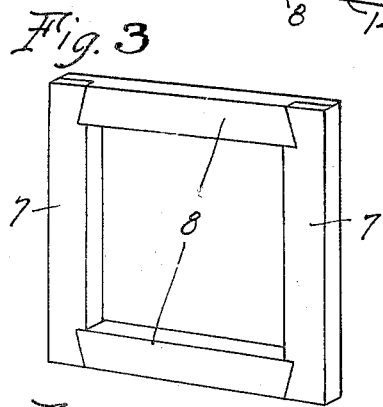
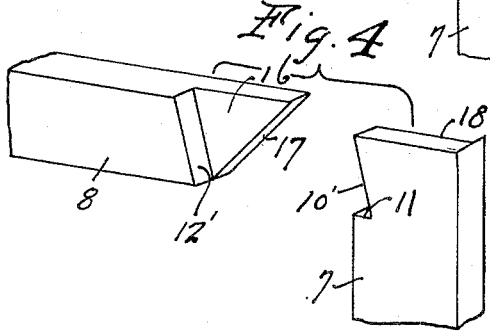
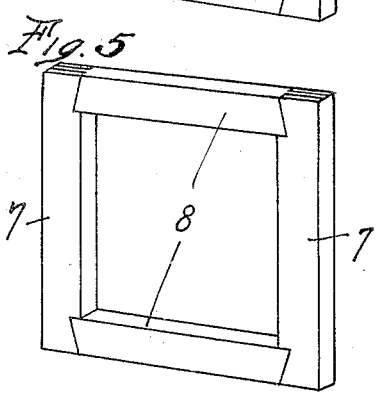
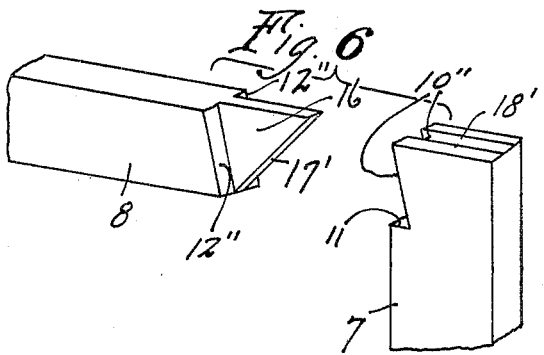
WITNESSES
INVENTOR
Frederick Charles Reinecke
BY
Herbert E. Smith
his ATTORNEY
COLUMBIA PLANOGRAPH CO., WASHINGTON, D. C.

UNITED STATES PATENT OFFICE.

FREDERICK CHARLES REINECKE, OF SPOKANE, WASHINGTON.

JOINT FOR CRATES.

1,098,405.   Specification of Letters Patent.   Patented June 2, 1914.

Application filed July 25, 1912. Serial No. 711,453.

*To all whom it may concern:*

Be it known that I, FREDERICK CHARLES REINECKE, a citizen of the United States, residing at Spokane, in the county of Spokane and State of Washington, have invented new and useful Improvements in Joints for Crates, of which the following is a specification.

My present invention relates to crates, and more particularly to that type which may be used for shipping fruit, where a container, light in weight, but rigid in construction to withstand rough handling in transportation is desired.

A principal object of my invention is to provide crate ends which may be made the nucleus of strength of the crate, to provide the desired rigidity thereof, so that the crate parts may be shipped in compact form and readily assembled, when desired, by use of common expedients, such as nails and a hammer, no other tools being necessary to assemble the parts into a crate. Thus, by the construction and disposition of parts, according to my invention, a crate end, as an article of manufacture, may be provided, the sides of the crate, when assembled, being of common boards, strips or veneer, such as may be readily obtained in almost any locality.

In the drawings, forming a part of this specification: Figure 1 is a perspective view of a crate embodying my invention. Fig. 2 is a detailed view in perspective showing the adjacent ends of members forming a part of the end frames of the crate. Fig. 3 is a view in perspective showing a modified form of crate and frame. Fig. 4 is a view similar to Fig. 3 showing in detail the joining of members disclosed in Fig. 3. Fig. 5 is a view similar to Fig. 3 showing a further modification of my invention. Fig. 6 is a view similar to Fig. 4 showing in detail means for joining the frame members disclosed in Fig. 5.

Similar characters refer to similar parts throughout the views.

Each crate end comprises two upright frame members designated by 7, and two complementary transverse parallel frame members 8, disposed at right angles to and joining the ends of members 8, an end retaining wall 9, such as formed by strips of wood, may be provided, as desired.

With particular reference to Figs. 1 and 2 it is to be noted that the inner face of each upright frame member is angularly notched adjacent each end to provide an undercut wall 10 at an acute angle to the end face of the member to which it is adjacent, and an abutment wall 11, extending from the inner end of wall 10 to the inner face of the member, preferably at right angles to the said inner face. The ends of members 8 are formed complementary to the notches in members 7, as at 12, to join them. As disclosed in Figs. 1 and 2, the notch extends the entire width of the members 7, and the parts are held in place by nails driven transversely through members 7 and longitudinally into transverse members 8; diagonally and inwardly from the ends of members 7 extending diagonally into members 8 through the faces 12 thereof, or, with a wall 9 provided, the nails may be driven into the inner faces of members 7 and 8 passing through said walls 9 and rigidly holding the members in alinement. When the crate is assembled and contains material, the top 13 is recognizable as having been the last wall made fast to the ends; the bottom 14 being opposite from the top 13, and the sides 15 joining the complementary members 7 of the two end frames. It is to be noted that because of the undercut angular notches and the transverse strips fitting thereinto, a rigid frame is provided and neither the bottom or top can be removed, pulling with it the transverse members to which it is secured, since the members 8, form, as it were, a dove-tailed joint with the upright members 7. This is in contradistinction to the end frame members joined by the common notched joint formed by removing a squared portion from each member, in thickness, one-half the width of the member, and fitting the two notched portions together, since the wood invariably splits with the grain, and permits the parts to separate when subjected to shock.

In Figs. 3 and 4 I have disclosed a modified form of joint, in which the wall 10′ disclosed similarly to the wall 10 in the previous modification, extends only one-half the width of the members 7, the end 12′ of the members 8 being formed complementary to wall 10′ for one-half the width of such member, and a tongue 16 extending from the end of member 8, beveled as at 17, the side to lie adjacent member 7. The latter member has a recess 18 formed complementary to tongue 16 and receiving the same. By this construction, the frame member may be effectively joined by small nails driven through the tongue 16 into the portion of member 7 laterally thereof, or vice versa.

In Figs. 5 and 6 I have shown a further modified form, similar to that disclosed in Figs. 3 and 4, except that two walls 10″ are provided, disposed similar to wall 10′ in the previous modification, these walls being separated by a recess 18′, formed similar to recess 18 in the previous modification, while the member 8 has beveled portions 12″ and a tongue 16′ having a beveled portion 17′ all coacting as in the previous modification.

From the foregoing it is made manifest that in a crate, constructed according to the modifications disclosed in Figs. 3 to 6, inclusive, as in the form disclosed in Figs. 1 and 2, the top and bottom, when secured to members 8, cannot be removed carrying with them such members, owing to the joint between the frame members, and further, the crate cannot be readily distorted from a cubical or oblong shape, owing to the abutment walls 11 and coacting parts.

I claim:—

A frame comprising in combination, opposite pairs of counterpart strips arranged to form a rectangular frame, the strips of each pair having ends of identical formation, the ends of the strips of one pair being provided with an angular notch so that their inner faces incline toward the opposite ends of the strips and inwardly toward the body of the strips to form outwardly facing shoulders at right angles to the longitudinal axes of said strips, the ends of the strips of the other pair being beveled to form complementary faces to fit in said notches, and said first mentioned pair of strips being each provided with a recess whose bottom intersects said shoulders and inclines upwardly and outwardly in a direction reverse to that of said inclined faces, and said second mentioned pairs of strips being each provided with a tongue complementary in shape to said recess.

In testimony whereof I affix my signature in the presence of two witnesses.

FREDERICK CHARLES REINECKE.

Witnesses:
HAROLD ELLIS SCANTLEBURY,
NETTIE KING.

---

Copies of this patent may be obtained for five cents each, by addressing the "Commissioner of Patents, Washington, D. C."